INVENTORS.
W. A. KEENE
N. T. BLASOR

BY *Young and Quigg*

ATTORNEYS

INVENTORS.
W. A. KEENE
N. T. BLASOR
BY
ATTORNEYS

Sept. 29, 1964 W. A. KEENE ETAL 3,150,478
BAG CLOSING MACHINE
Filed Dec. 26, 1961 7 Sheets-Sheet 3

INVENTORS.
W. A. KEENE
N. T. BLASOR
BY
*Young and Quigg*
ATTORNEY.

Sept. 29, 1964 W. A. KEENE ETAL 3,150,478
BAG CLOSING MACHINE
Filed Dec. 26, 1961 7 Sheets-Sheet 4

INVENTORS.
W. A. KEENE
N. T. BLASOR
BY
*Young and Quigg*
ATTORNEYS

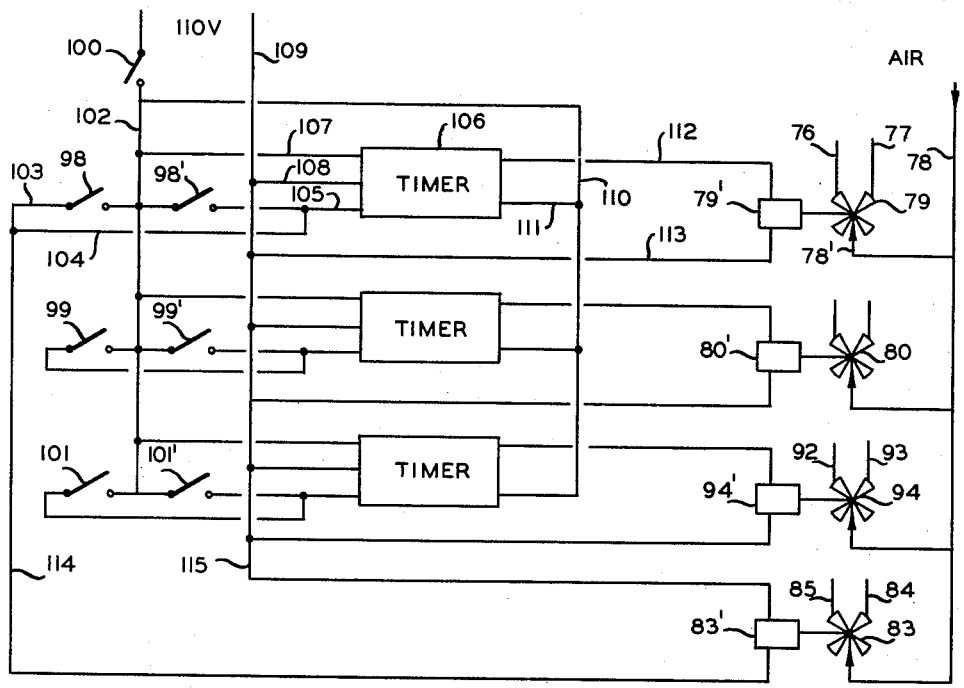
FIG. 11
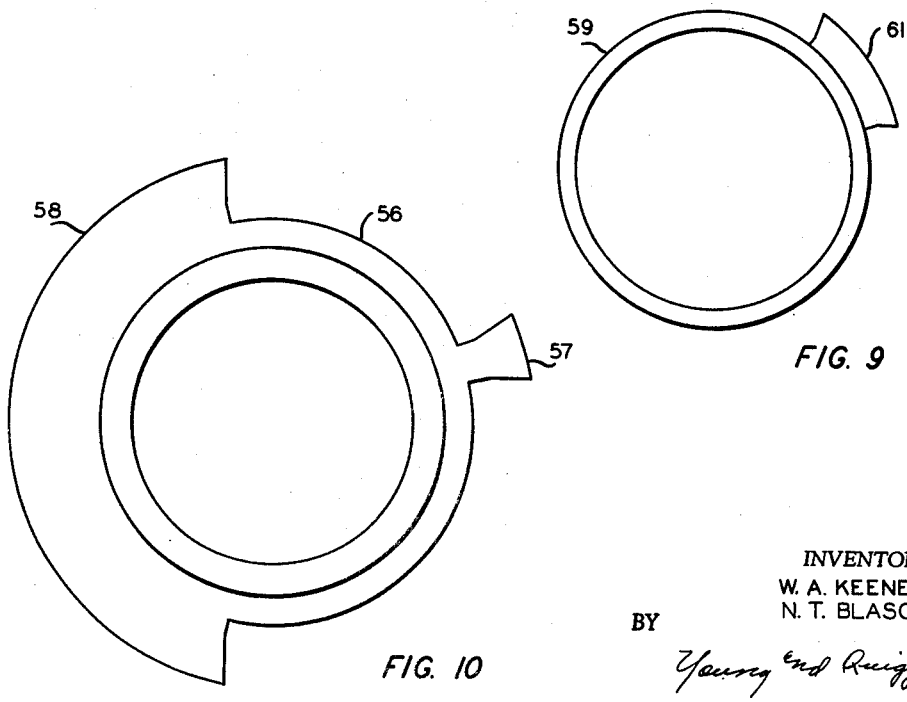
FIG. 9
FIG. 10

Sept. 29, 1964  W. A. KEENE ETAL  3,150,478
BAG CLOSING MACHINE
Filed Dec. 26, 1961
7 Sheets-Sheet 6

INVENTORS.
W. A. KEENE
N. T. BLASOR
BY
ATTORNEYS

United States Patent Office 3,150,478
Patented Sept. 29, 1964

3,150,478
BAG CLOSING MACHINE
William A. Keene and Norman T. Blasor, Bartlesville, Okla., assignors to Phillips Petroleum Company, a corporation of Delaware
Filed Dec. 26, 1961, Ser. No. 162,150
8 Claims. (Cl. 53—370)

This invention relates to a bag closing machine and method. In one aspect this invention relates to a machine for closing open mouth bags. In another aspect this invention relates to a method for closing open mouth bags.

Many products such as carbon black, fertilizer, cement, lime, grain feeds, and other granular or powdery materials are packaged in paper bags for delivery to the ultimate consumer. Generally speaking, three types of bags are in use, the valve bag, the pasted open mouth bag, and the sewn open mouth bag. For many products a pasted closure for the open mouth bag is not practical. The valve bag is more costly. So far as is presently known, no automatic bag filling machines are available for filling valve type bags. Furthermore, the machines presently available for filling valve type bags do not weigh as accurately as do machines or apparatus for filling open mouth bags. For these reasons the open mouth bag is most widely used and recently several companies have developed automatic bagging equipment for open mouth bags which includes automatic sewing equipment to close the open mouth of the bag by sewing. However, in many instances the automatic sewing equipment has proved troublesome and impractical resulting in excessive maintenance costs. Furthermore, a sewed bag has a tapered end which has a poor appearance and poor warehousing qualities.

In copending application Serial No. 105,059, filed April 24, 1961, there is disclosed and claimed a bag closing machine and method for closing open mouth bags. Said machine has successfully solved the above-discussed problems connected with the use of open mouth bags. However, with some materials, such as low bulk density materials, there sometimes are difficulties associated with removing the filled and closed bag from the machine. The present invention is an improvement on the invention of said copending application and provides an improved means for removing a filled and closed bag from said machine of said copending application.

An object of this invention is to provide an improved bag closing machine for closing open mouth bags. Another object of this invention is to provide an improved bag closing machine which is provided with improved means for removing a filled and closed bag from said machine. Another object of this invention is to provide an improved method for closing open mouth bags. Another object of this invention is to provide a method and a machine for closing open mouth bags, which method eliminates closing said bag by sewing. Another object of this invention is to provide a method and machine for closing open mouth bags which eliminates closing said bag by pasting. Still another object of this invention is to provide a bag closing method and machine for closing open mouth bags which can be entirely automatic in operation, if desired, so that a filled bag can be delivered to the machine from a bag filling machine and all of the operations for completing the closing of the bag will be entirely automatic. Still another object of this invention is to provide a method and machine for closing open mouth bags as heretofore characterized which can be operated at high speed, so that closing of the bag can be effected as rapidly as the filling of the bag, with the result that a single machine for closing bags may handle all of the filled bags delivered by an automatic bag filling machine. Still another object of this invention is to provide, when starting with an open mouth bag, a closed, filled bag which is relatively flat on both the bottom and top and thus possesses a box-like shape which is more desirable, both for appearance and for handling and stacking purposes. Other aspects, objects, and advantages of the invention will be apparent to those skilled in the art in view of this disclosure.

In the practice of the invention there is provided a bag closing machine which, in a presently preferred embodiment, broadly comprises a rotary turntable unit provided with four bag receiving pockets on four different sides thereof. Said rotary turntable unit is rotated through four consecutive stations at which various operations of the method of the invention are carried out. Thus, a filled bag is moved into vertical position to a pocket of said machine occupying a first station. As said bag is moved into said pocket, the lips of the bag are introduced between a pair of open fingers extending horizontally above said pocket. The bag upon entry into said pocket actuates the machine and simultaneously, the pocket containing said bag is moved from said first station to a second station, said fingers are closed to engage the lips of said bag and rotated so as to roll said lips around said fingers downwardly onto the body of the filled bag, and said filled bag is elevated an amount sufficient to compensate for said downward rolling of said lips. All of said operations occur simultaneously with the movement of the pocket containing said bag from said first station to said second station. While at said second station, at least one piece of pressure sensitive adhesive tape is applied across the rolled down lips of the bag. The pocket containing said bag is then moved to a third station at which the bag is removed from said fingers and the machine by means which applies a force to said bag throughout the greater portion (at least one-half) of its length immediately below said rolled lips and the bag is moved onto a conveyor for transport to storage or other handling.

FIGURE 1 is a general perspective view of a bag closing machine in general accordance with the invention and illustrating filled bags in two pockets of the machine stationed at stations 1 and 2, with a bag having just been ejected from station 3. The drawing is diagrammatic in that it has been simplified by omitting the bag removing means which is shown in detail in several of the other drawings. Said FIGURE 1 also illustrates the relation between the bag closing machine and other bag filling and handling apparatus.

Figure 1:
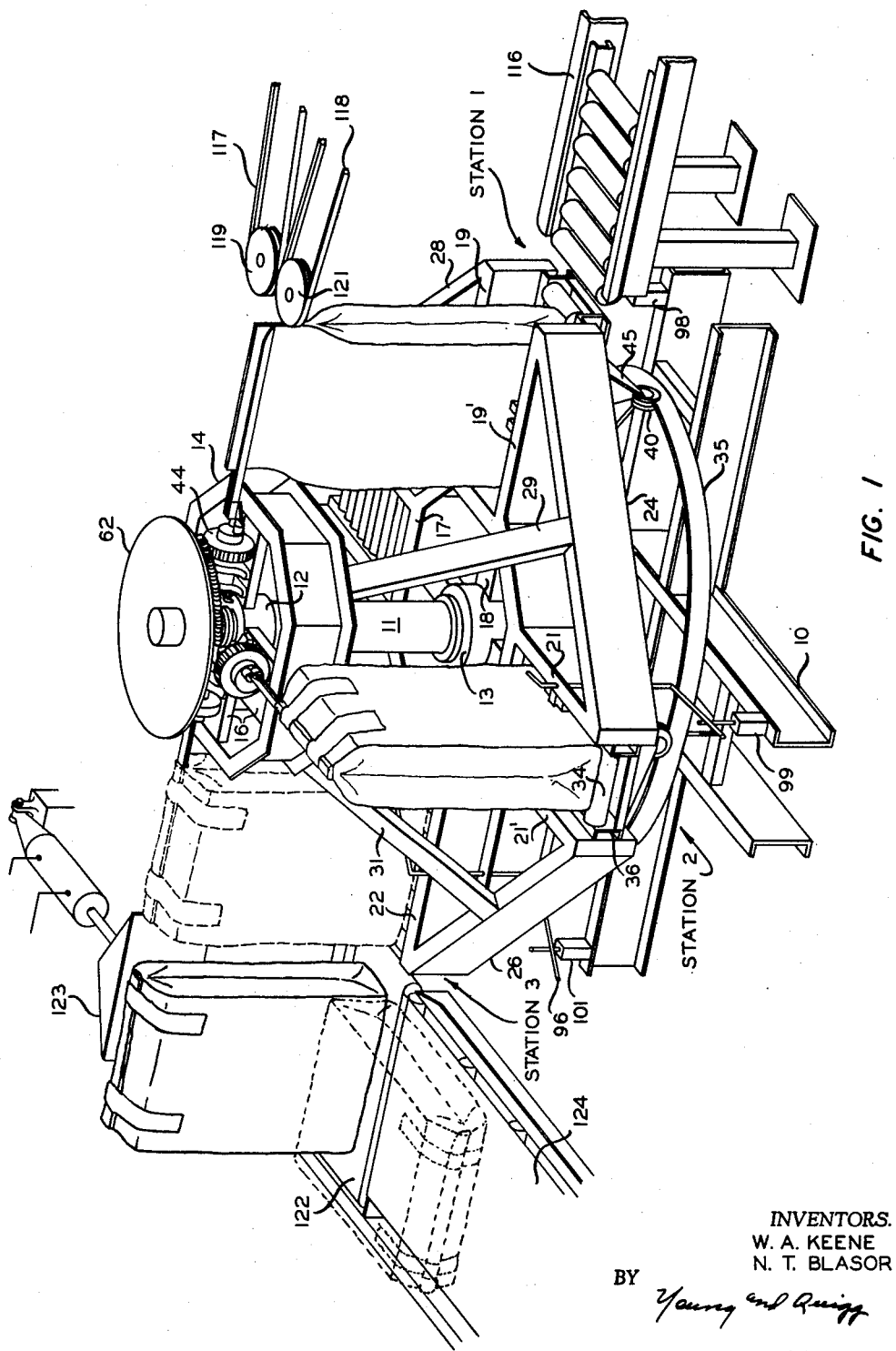
Figure 2:
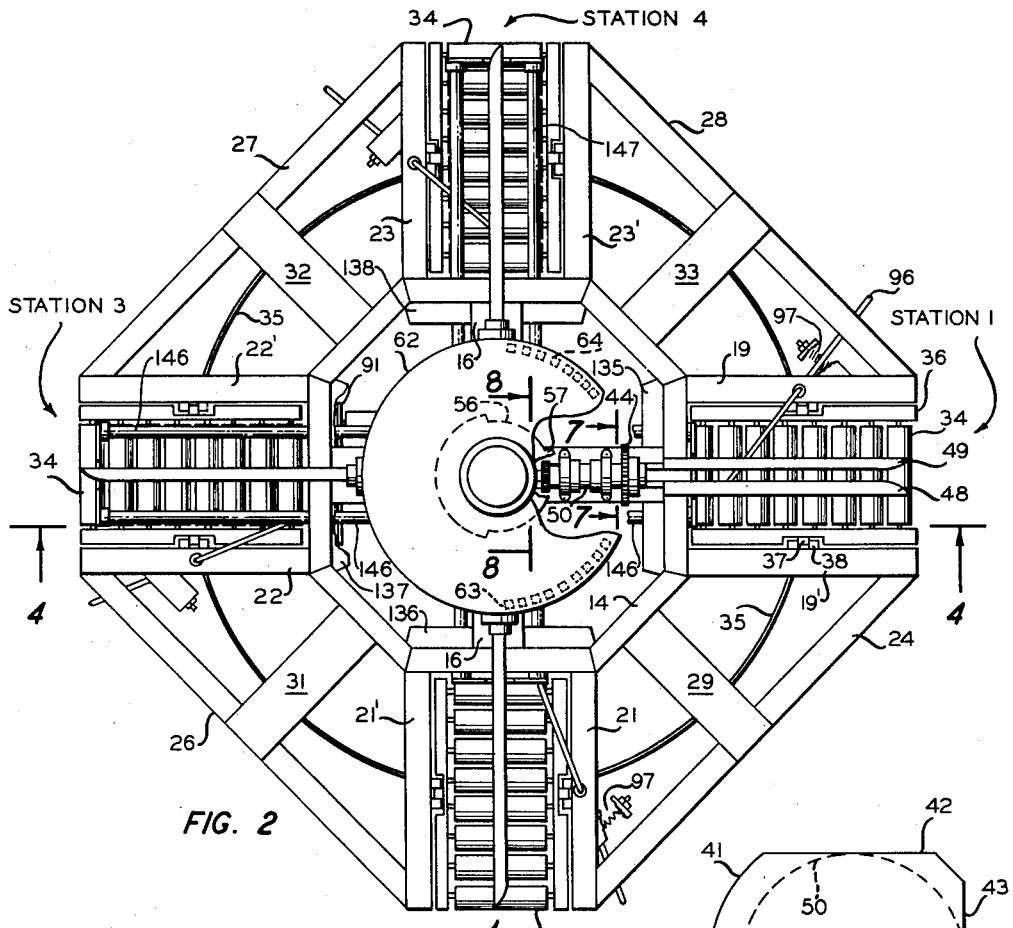
FIGURE 2 is a more detailed plan view of the bag closing machine of FIGURE 1, without the filled bags in the pockets at the various stations, and includes the bag removing means of the invention.
Figure 3A:
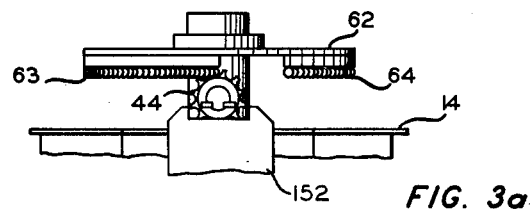
FIGURE 3 is a more detailed view in elevation of the lower portion of the bag closing machine of FIGURE 1 when looking at station 1 of said machine, and includes the bag removing means of the invention.

FIGURE 3a is a view in elevation of the top portion of the bag closing machine of FIGURE 1 when looking at station 1 thereof and is fragmentary or diagrammatic in that the drawing has been simplified by omitting the finger mechanism which normally would be shown as extending over the pockets at stations 2 and 4 as shown in FIGURES 1 and 2. Otherwise, the view in FIGURE 3a corresponds to the upper portion of the machine as viewed in FIGURE 3.

Figure 4A:
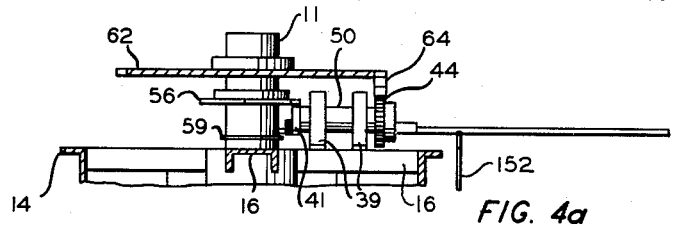
Figure 4:
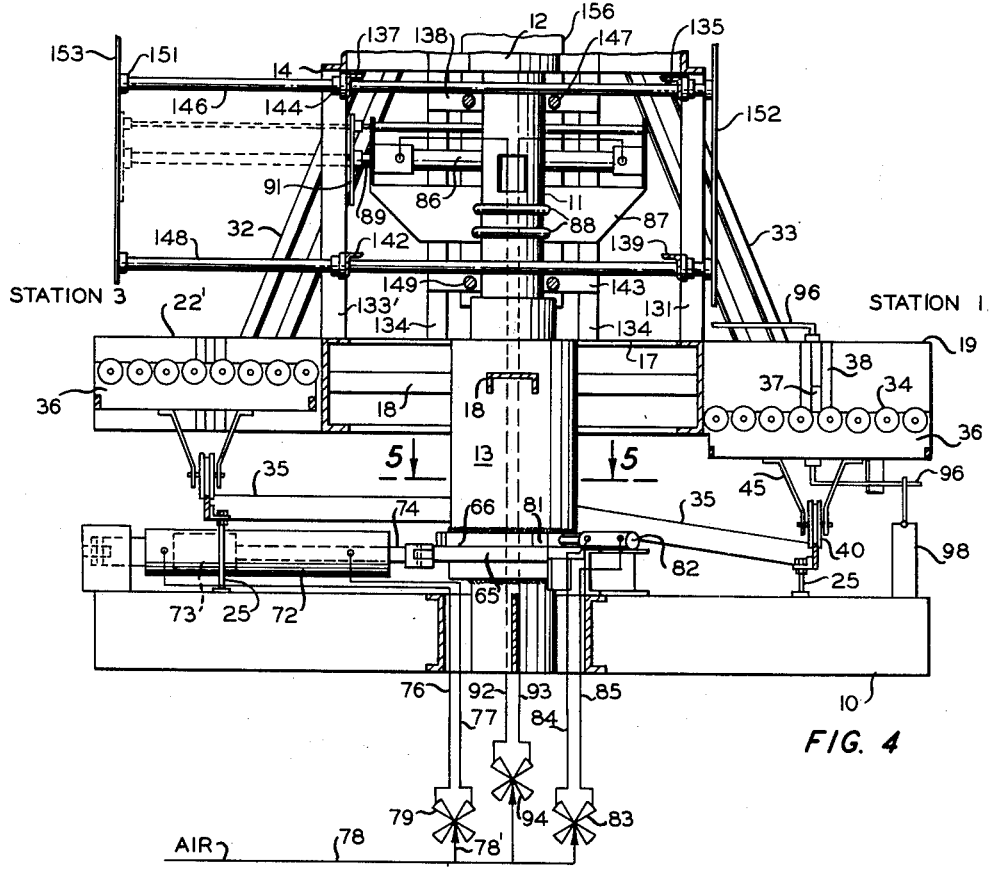

FIGURE 4 is a sectional view taken substantially along the line 4—4 of FIGURE 2.

Figure 5:
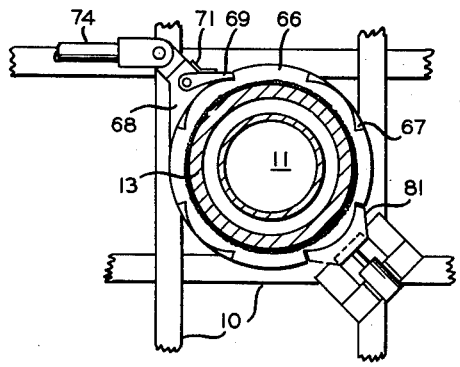

FIGURE 4a is a view in elevation of the top portion of the machine of FIGURE 1 when looking at station 2 and is fragmentary or diagrammatic in that the drawing has been simplified by omitting the finger mechanism which would normally be shown as extending over the pockets at stations 2 and 3 as shown in FIGURES 1 and 2. Otherwise, the view in FIGURE 4a corresponds to the upper portion of the machine as viewed in FIGURE 4, FIGURE 5 is a detail view, partly in section, taken along the line 5—5 of FIGURE 4 and illustrates a portion of the mechanism for rotating the frame of the machine.

Figure 6:
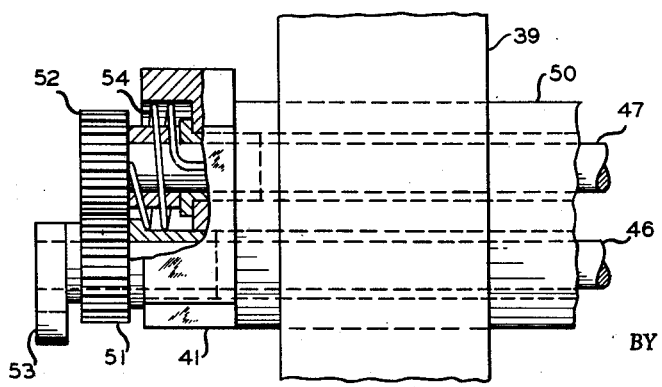

FIGURE 6 is a detail view, partly in section, illustrating details of the means for rotating and closing and opening the fingers which engage the open lips of the filled bag as illustrated in FIGURE 1.

Figure 7:
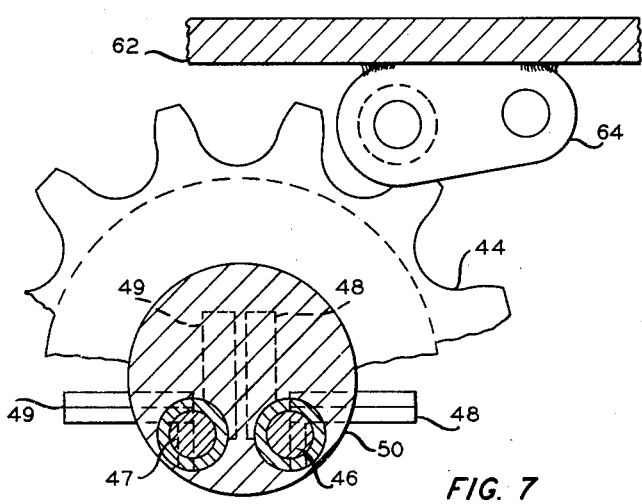

FIGURE 7 is a detail view, partly in section, taken along the line 7—7 of FIGURE 2 and illustrates other details of the means for rotating the fingers which engage the lips of the open bag as illustrated in FIGURE 1.

Figure 8:
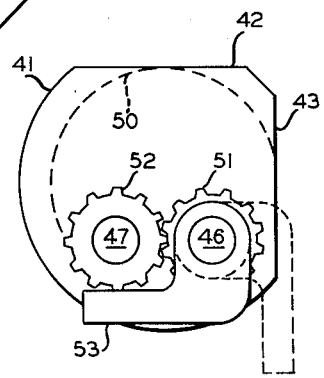

FIGURE 8 is a detail view taken along the line 8—8 of FIGURE 2 and illustrates still other details of the means for rotating and closing and opening the fingers which engage the lips of the open bag as illustrated in FIGURE 1.

FIGURES 9 and 10 are detail plan views illustrating still other details of the means for rotating and closing and opening the fingers which engage the lips of the open bag as illustrated in FIGURE 1.

FIGURE 11 illustrates one suitable wiring diagram which can be employed in controlling the operation of the bag closing machine of the invention.

Figure 12:
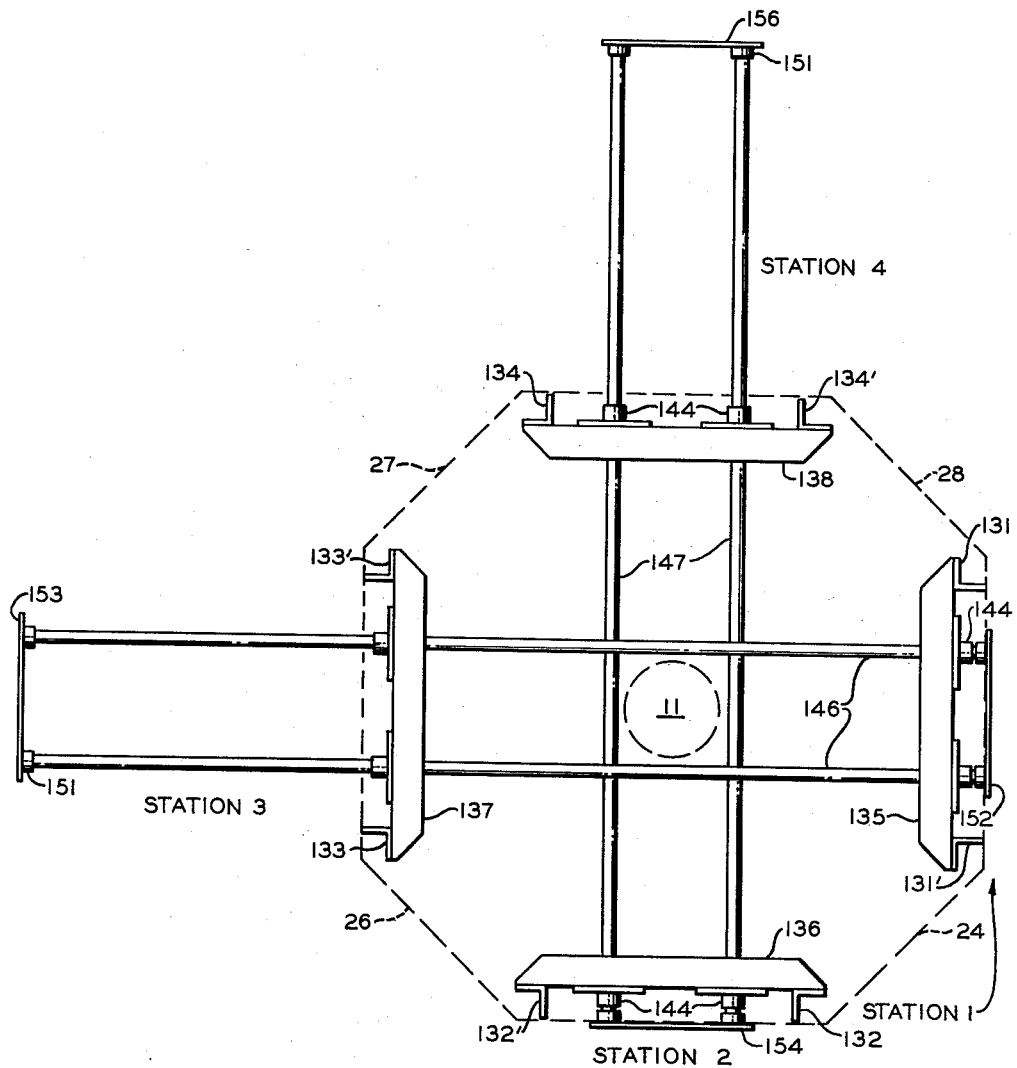

FIGURE 12 is a diagrammatic plan view of the new bag removing means which, in accordance with the present invention, is employed in combination with the invention of said copending application.

Figure 13:
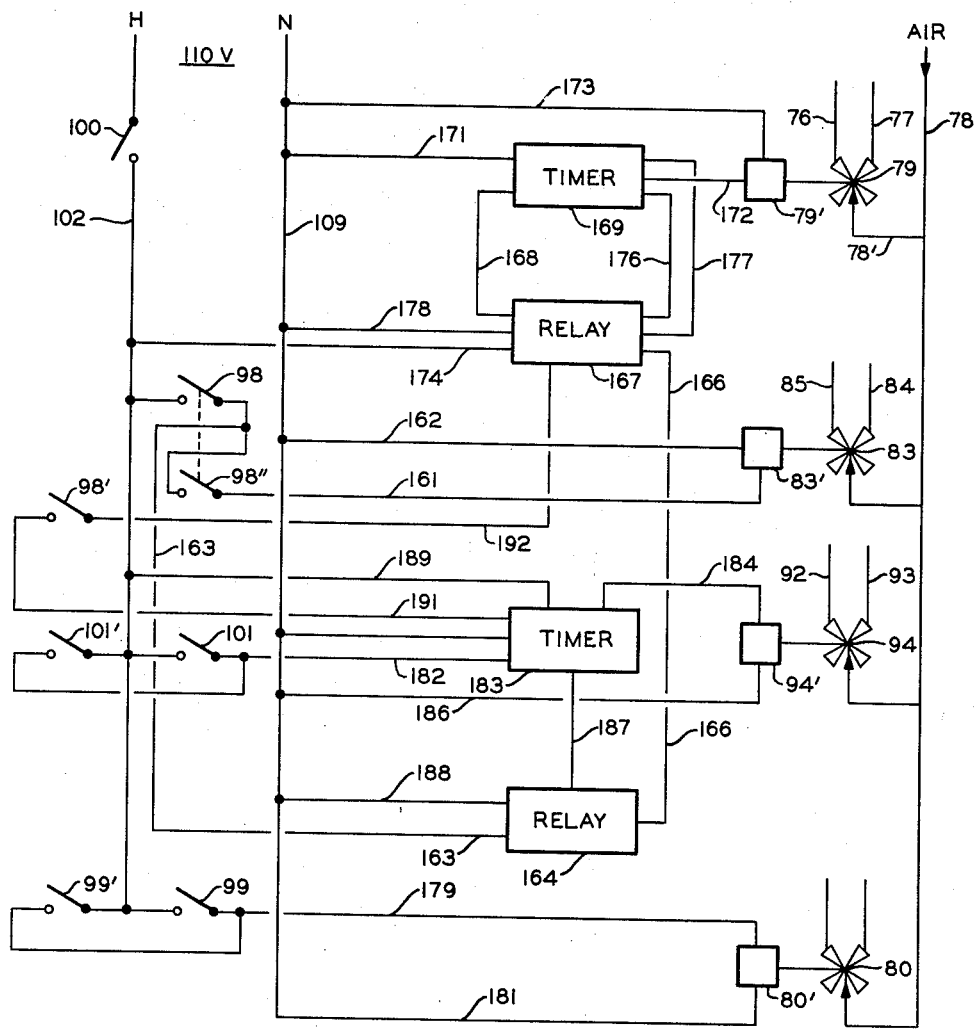

FIGURE 13 illustrates another suitable wiring diagram which can be employed in controlling the operation of the bag closing machine of the invention.

Referring now to the drawings, wherein like reference numerals are employed to denote like elements in the various drawings, the invention will be more fully explained. In the emobdiment illustrated in said drawings the bag closing machine of the invention comprises a base 10 which can be fabricated from any suitable type of structural materials such as the channel beams illustrated. A vertical support column 11 is centrally disposed with respect to and is attached at its lower end to said base. A first hub 12 is rotatably mounted around the upper portion of said column. A second hub 13 is rotatably mounted around the lower portion of said column.

A frame surrounds said column 11 and is comprised of a first ring-like member 14 in the shape of an octagon surrounding said column 11 at the level of and attached to said first hub 12 by means of a plurality of supporting spokes 16. A second ring-like member 17 in the shape of an octagon surrounds said column 11 at the level of and is attached to said second hub 13 by means of a second plurality of supporting spokes 18. Although not essential, said ring-like members 14 and 17 are substantially the same "diameter." A first, a second, a third, and a fourth pair of spaced apart wall members 19–19′, 21–21′, 22–22′, and 23–23′, respectively, extend horizontally from four different sides of said second ring-like member 17 to form respectively a first, a second, a third, and a fourth bag receiving pocket. In the machine here illustrated said pockets are spaced equidistantly, i.e., 90°, from each other with respect to the center lines thereof. As explained further hereinafter, each of said pockets consecutively occupies a first, a second, a third, and a fourth station during rotation of said frame. Separate connecting members 24, 26, 27, and 28, respectively, connect adjacent sides of said first and second pockets, adjacent sides of said second and third pockets, adjacent sides of said third and fourth pockets, and adjacent sides of said fourth and first pockets. Separate brace members 29, 31, 32, and 33 extend between and connect said first ring-like member 14 to said connecting members 24, 26, 27, and 28, respectively.

A bag conveyor assembly is mounted in and forms the bottom of each of said bag receiving pockets. Each of said bag conveyor assemblies comprises a plurality of conveyor rolls 34 rotatably mounted between a pair of mounting brackets 36. Each of said mounting brackets is provided with a tongue 37 extending from the wall of a recess formed at about the midpoint of the bracket. Said tongue 37 co-operates with a grooved boss 38 formed on the inner wall of each of said wall members, for example 19 and 19′. Each of said bag conveyor assemblies is thus slidably mounted for limited vertical movement between the wall members of one of said pockets. A circular track 35 is mounted on said base 10 by means of the adjustable bolts 25 shown. It will be noted that said track has a lower elevation at said first station than at said second, third, and fourth stations. A wheel 40, or other suitable supporting means such as a slide, is mounted in a bracket 45 attached to the bottom of said mounting brackets 36 on each of said bag conveyor assemblies and supports each of said bag conveyor assemblies on said track 35.

The bag closing machine illustrated in the drawings is provided with four bag engaging and closing means (see FIGURES 1, 2, and 4a), one each of which is positioned above and extends horizontally over each of said bag receiving pockets. Each of said bag engaging and closing means comprises a main shaft 50 rotatably mounted in bearings 39 on said frame (support members 16) above said first hub 12 with the inboard end of said main shaft adjacent said support column 11. A collar 41 is fixed to said inboard end of said main shaft 50. Said collar 41 is provided with a first flat cam surface 42 and a second flat cam surface 43 (see FIGURE 8) on adjacent sides thereof. A sprocket wheel 44 is fixed on said main shaft 50 adjacent the outboard end thereof. First and second spaced apart parallel finger shafts 46 and 47 (see FIGURES 6, 7, and 8) are rotatably mounted within said main shaft 50 and extend beyond both the inboard and outboard ends thereof. First and second spaced apart parallel polished fingers 48 and 49 (see FIGURE 2) are attached respectively to the outboard ends of said first and second finger shafts 46 and 47. A pair of said fingers 48 and 49 extends above each one of said pockets and is adapted, as explained further hereinafter, to receive the lips of a filled open mouth bag when said bag is moved into the one of said bag receiving pockets which is occupying station 1.

Referring now to FIGURES 6 and 8, a first spur gear 51 is mounted on said first finger shaft 46 at the inboard end thereof. A second spur gear 52 is mounted on said second finger shaft 47 at the inboard end thereof and is adapted to engage said first spur gear. A cam lug 53 is fixed to the inboard side of said first spur gear 51. A torsion spring 54 is mounted around said second finger shaft 47, fixed to said spur gear 52 and said collar 41, and is normally biased to cause said spur gears to rotate said finger shafts 46 and 47 in a direction to cause said fingers 48 and 49 to be in the closed engaging position as shown in FIGURE 1.

A first slide plate 56 (see FIGURES 2, 4a, and 10) is fixed around the periphery of said column 11 above said first hub 12. Said slide plate 56 is provided with a first extension 57 thereon which extends outwardly between station 4 and station 1 and is positioned adjacent said station 1 so as to engage said first cam surface 42 on said collar 41 just prior to arrival of main shaft 50 in a position above station 1 when said frame is being rotated and thus prevent rotation of said main shaft 50 prior to and while it is at said station 1. Said slide plate 56 is also provided with a second extension 58 thereon which extends substantially between station 2 and station 4 and is adapted to engage said second flat cam surface 43 on collar 41 during rotation of the frame around said column 11 and prevent rotation of said main shaft 50 while it is traveling between station 2 and station 4. A second slide plate 59 (see FIGURES 4a and 9) is fixed around the periphery of said column 11 between said first slide plate 56 and said first hub 12. Said second slide plate 59 is provided with an actuating lug 61 which extends therefrom between station 4 and station 1 and is positioned so as to engage said cam lug 53 which is fixed to said spur gear 51, cause said spur gears 51 and 52 to rotate, and open said fingers 48 and 49 just prior to their arrival in a position above said station 1.

A circular drive palte 62 (see FIGURES 1, 2, 3a and 4a) is fixed on said column 11 above said first slide plate 56. A first segment of rack gears 63 is mounted on the under side of said drive plate 62 adjacent the periphery thereof between said first and second stations for coacting with said sprocket wheel 44 to rotate said main shaft 50 and said fingers 48 and 49 and thus roll the lips of said bag around said fingers as said frame is rotated from said first station to said second station as described further hereinafter. A second segment of rack gears 64 is mounted on the under side of said drive plate 62 adjacent the periphery thereof between said fourth and said first stations, and is spaced apart from said first segment of rack gears, for coacting with said sprocket wheel 44 to rotate said main shaft 50 and said finger shafts 46 and 47 sufficient to place said fingers 48 and 49 in an open receiving position just prior to their arrival at station 1. Said rack gears 63 and 64 can be any type of gear suitable for engaging the teeth of sprocket 44. One convenient type of gear arrangement is a series of individual links of "bicycle type" or roller chain welded to drive plate 62. The size and spacing between the links will depend upon the size of sprocket 44.

Referring now to FIGURES 4 and 5, an indexing ring 66 is secured to and surrounds the lower portion of said second hub 13. In the embodiment of the invention here shown, said indexing ring 66 is provided with four indexing recesses 67 spaced equally apart around the outer circumference thereof. A shoulder 68 extends from one side of a slip ring 65 surrounding but not fixed to said second hub 13 below said indexing ring 66. A pawl 69, biased by means of spring 71 to normally engage one side only of said recesses so as to move said ring 66 in one direction only, is pivotally mounted on said shoulder 68. A first cylinder 72 is mounted on said base 10 below said frame and adjacent said shoulder 68. A double acting fluid operated piston 73 is disposed within said cylinder 72. A piston rod 74 is connected at one end within said cylinder to said piston 73 and at its other end to said shoulder 68 on said indexing ring 66. Fluid conduits 76 and 77, connected to air manifold 78 through solenoid actuated four-way valve 79, are provided for delivering actuating air to and from cylinder 72 for actuating said piston 73 so as to rotate said frame by the action of pawl 69 on one side of recesses 67. A double acting brake member 81 is provided for engaging both sides of recesses 67 in indexing ring 66 so as to prevent rotation of the frame in either direction except when desired. Said brake member is actuated by a double acting piston (not shown) in cylinder 82 suitably mounted on said base 10. Said cylinder 82 is supplied with actuating air from manifold 78 via solenoid actuated valve 83 and conduit 84 simultaneously with the supplying of air to said first cylinder 72. Thus, when air is supplied to said cylinder 72, air is also supplied to cylinder 82 so as to move brake member 81 out of engagement with recesses 67 and permit rotation of ring 66. Said air manifold 78 is connected to a source of compressed air, not shown. Solenoid actuated valves 79, 83 and 94 have been shown schematically in FIGURE 4 in order to simplify the drawings. In actual construction said valves are mounted at suitable positions on base 10. The relationship between said valves and their actuating solenoids and the electrical system of the machine is shown in FIGURE 11.

A second cylinder 86 is mounted on said column 11 above said first hub 13 by means of rings or U-bolts 88 attached to said column and mounting plate 87 attached to said rings. A double acting fluid operating piston (not shown) is disposed within said cylinder 86. A piston rod 89 is connected at one end within said cylinder 86 to said piston and at its other end to a vertically disposed drive plate 91. Actuating fluid is conducted to and from said cylinder 86 by means of conduits 92 and 93 which are connected to fluid manifold 78 via solenoid actuated four-way valve 94. The actuating fluid used in cylinders 72 and 86 is preferably air as indicated in FIGURE 4 or can be a hydraulic fluid by making suitable modifications to the fluid supply system.

Referring now to FIGURES 2, 3, 4, and 12, a first, a second, a third, and a fourth pair of vertical support members 131–131', 132–132', 133–133', and 134–134', respectively, are attached to and extend between said upper ring-like member 14 and said lower ring-like member 17 adjacent said first, second, third, and fourth bag receiving pockets 19–19', 21–21', 22–22', and 23–23', respectively. A first, a second, a third, and a fourth upper horizontally extending bearing support 135, 136, 137, and 138 are attached, respectively, to said first, second, third, and fourth pair of vertical support members adjacent the upper ends thereof. A first, a second, a third, and a fourth lower horizontally extending bearing support 139, 141 (not shown), 142, and 143 are attached, respectively, to said first, second, third, and fourth pair of vertical support members adjacent the lower ends thereof. Said bearing supports can be fabricated from any suitable type of structural material, e.g., for example, the angle beams as illustrated. A pair of spaced apart holes is provided in each of said upper and said lower bearing supports. A bearing block 144 comprising a plate attached to said bearing support and a sleeve attached to said plate and extending through said hole provided in said bearing support is mounted on each of said upper and said lower bearing supports in each of said holes provided therein. A first upper pair of horizontal rods 146 extend slidably through said bearing blocks mounted in said first upper bearing support 135 and said third upper bearing support 137. A second upper pair of horizontal rods 147 extend slidably through said bearing blocks mounted in said second upper bearing support 136 and said fourth upper bearing support 138. A first lower pair of horizontal rods 148 extend slidably through said bearing blocks mounted in said first lower bearing support 139 and said third lower bearing support 142. A second lower pair of horizontal rods 149 extend slidably through said bearing blocks mounted in said second lower bearing support 141 (not shown) and said fourth lower bearing support 143.

A mounting collar 151 is attached to each end of each of said horizontal rods. A first vertically positioned bag push-off plate 152 and a third vertically positioned bag push-off plate 153 are attached to said mounting collars on the opposite ends of said first upper pair of horizontal rods 146 and said first lower pair of horizontal rods 148, said first and third push-off plates being respectively disposed above and adjacent said first bag receiving pocket 19–19' and said third bag receiving pocket 22–22'. A second vertically positioned bag push-off plate 154 and a fourth vertically positioned bag push-off plate 156 are attached to said mounting collars on the opposite ends of said second upper pair of horizontal rods 147 and said second lower pair of horizontal rods 149, said second and fourth vertically positioned push-off plates are respectively disposed above and adjacent said bag receiving pocket 21–21' and 23–23'.

As described further hereinafter, when actuating fluid is admitted to said cylinder 86 through conduit 93, the piston in said cylinder 86 is moved in a manner to cause drive plate 91 to contact one of said bag push-off plates 152, 153, 154, and 156 and move said bag push-off plate from the inboard edge to the outboard edge of the pocket occupying station 3 when said pocket arrives at said station 3, thereby emptying said pocket, and simultaneously moves the opposite bag push-off plate from the outboard edge to the inboard edge of the pocket occupying station 1, and thereby opening said last-mentioned pocket. This relationship is illustrated in FIGURE 4 where, as indicated by the dotted lines, drive plate 91 has just completed the above-described movements and has returned to its retracted position.

An actuating lever 96 comprising an upper and a lower horizontal bar connected by means of a vertical rod is pivotally mounted in one of the wall members of each of the bag receiving pockets. In the embodiment of the invention illustrated, the vertical rod portion of said actuating lever is mounted in the right-hand wall member, for example, wall members 19, 21, 22, and 23 (see FIGURE 2). Said actuating lever 96 is mounted so that the upper horizontal bar thereof normally extends over the top of the bag receiving pocket and the lower horizontal bar extends below said bag receiving pocket and said frame. Said actuating lever 96 is normally biased in the position described by means of spring 97 (see FIGURE 2) attached to said lower horizontal bar and mounted as shown. Switches 98, 99, and 101 (see FIGURES 1 and 4) are mounted on said base 10 at stations 1, 2, and 3, respectively, in a position such that the lower horizontal bar of actuating lever 96 will strike the actuating bar of said switches as the frame is rotated. Switches 98', 99', and 101' (see FIGURE 11) are hand operated switches provided for manual operation when such manual operation is desirable or necessary as in starting up or emptying the machine.

Before proceeding further with the detailed description of the mechanical elements of the invention it is believed it would be helpful to briefly describe the rotating cycle of the machine from an empty start-up condition until the machine is in condition for normal operation. Assume the machine to be empty and in the position illustrated in FIGURES 2, 3, and 4. The position and condition of the bag receiving pockets will be as follows:

(a) Pocket 19-19' is at station 1, is empty, and is "open" because push-off plate 152 is in the retracted position;

(b) Pocket 21-21' is at station 2, is empty, and is also "open" because push-off plate 154 is in the retracted position;

(c) Pocket 22-22' is at station 3, is empty, and is "closed" because push-off plate 153 is in the extended position;

(d) Pocket 23-23' is at station 4, is empty, and is also "closed" because push-off plate 156 is in the extended position.

Let a filled, unclosed bag enter bag receiving pocket 19-19' at station 1. This will actuate switch 98, as described further hereinafter, and cause the rotating frame of the machine to rotate 90°. The position and condition of the bag receiving pockets will now be:

(a) Pocket 19-19' it at station 2 and filled with a closed bag the lips of which have been rolled around fingers 48 and 49 as described hereinafter;

(b) Pocket 21-21' is at station 3, is empty and is "closed" because push-off plate 154 was moved to its extended position when pocket 21-21' arrived at station 3 and switch 101 was actuated;

(c) Pocket 22-22' is at station 4, is empty, and is "closed" because push-off plate 153 remained in its extended position;

(d) Pocket 23-23' is at station 1, is empty, and is "open" because push-off plate 156 was retracted simultaneously when push-off plate 154 at station 3 was moved to its extended position.

Let another filled, unclosed bag enter the open pocket 23-23' at station 1. This will again actuate switch 98 and cause the rotating frame to rotate another 90°. Upon arrival of filled pocket 19-19' at station 3 from station 2, switch 101 (see FIGURE 11) will be actuated and push-off plate 152 will empty said pocket 19-19' by pushing the filled bag onto conveyor 122 (see FIGURE 1) and open pocket 22-22' which has been moved into station 1. The position and condition of the bag receiving pockets will now be:

(a) Pocket 19-19' is at station 3, is empty, and is "closed";

(b) Pocket 21-21' is at station 4, is empty, and is "closed";

(c) Pocket 22-22' is at station 1, is empty, and is "open";

(d) Pocket 23-23' is at station 2 and is filled with a closed bag the lips of which have been rolled around fingers 48 and 49 as described hereinafter.

The machine is now ready for normal operation and entry of another filled, unclosed bag into pocket 22-22' now at station 1 will again actuate switch 98 and cause the rotating frame to rotate another 90°. Upon arrival of filled pocket 23-23' at station 3 from station 2, switch 101 will again be actuated and push-off plate 156 will empty said pocket 23-23' by pushing the filled and closed bag onto conveyor 122 and open pocket 21-21' which has moved into station 1. The position and condition of the bag receiving pockets will now be;

(a) Pocket 19-19' is at station 4, is empty, and is "closed";

(b) Pocket 21-21' is at station 1, is empty, and is "open";

(c) Pocket 22-22' is at station 2, is filled with a closed bag;

(d) Pocket 23-23' is at station 3, is empty, and is "closed."

After one more stage of rotation the position and condition of the bag receiving pockets will be as first described above, i.e., pocket 19-19' will be at station 1, empty, and "open" to receive another filled, unclosed bag, etc.

Referring now to FIGURE 11, there is illustrated one suitable wiring and switch arrangement which can be employed to control the rotation and operation of the bag closing machine of the invention. When said machine is in normal operation, main switch 100 is closed. When a filled bag enters the bag receiving pocket occupying station 1, the bag strikes the upper horizontal bar of actuating lever 96 which causes the lower horizontal bar of said actuating lever 96 to strike the actuating bar of switch 98. Said switch 98 is a commercially available switch of a type commonly referred to as micro switches and normally makes contact only momentarily. Said momentary closing of switch 98 completes a circuit from main lead wire 102 through said switch 98, lead wire 103, lead wire 104, and lead wire 105 into timer 106.

Said timer 106 is a commercially available mechanism comprising a relay, an electric motor, and a cam. One side of the winding of said motor is connected into main lead wire 102 by lead wire 107. Said lead wire 105 is connected to the relay in timer 106. Said relay is connected to the other main lead wire 109 by means of lead wire 108. Upon actuation of said relay by the closing of switch 98 the motor in timer 106 is started and the cam, being connected to said motor, is rotated. Said relay keeps the circuit through lead wire 108 closed during revolution of the cam. At the end of of one revolution of said cam a notch on the surface of the cam causes the relay to break the circuit through lead wire 108 and the motor stops. During the time the motor is running a circuit is also completed from main lead wire 102 through lead wire 110, lead wire 111, said relay, lead wire 112, solenoid 79', and lead wire 113 to the other main lead wire 109. Said last-mentioned circuit actuates said solenoid 79' which switches four-way valve 79 to admit air from air header 78 and conduit 78' to conduit 76 which is connected to cylinder 72 (see FIGURE 4) of the rotating mechanism. At this time conduit 77, also connected to said cylinder 72, is connected to exhaust through said four-way valve 79. The admission of air through conduit 76 to cylinder 72 causes piston 73 to move in a direction to effect one stage of rotation, i.e., 90°, of the frame of the bag closing machine. When the motor in timer 106 stops, the circuit through solenoid 79' is broken and de-energization of said solenoid causes four-way valve 79 to switch to a position to admit air to cylinder 72 via conduct 77. Upon said switching of valve 79, conduit 76 is, of course, placed in exhaust position. This reverses the action of piston 73 and places the rotating mechanism in position for the next stage of rotation.

Said timer 106 can be any commercially available mechanism suitable for use in the practice of the invention. The type described generally above is a series RA-0 timer fitted with a gear rack A-18, available from the Industrial Timer Corporation, Newark, New Jersey. Four-way valve 79 is a conventional valve. As will be understood by those skilled in the art, conduit 78' is connected to the body of the valve and when the valve is switched said conduit 78' is placed in communication with first one and then the other of the lower ports shown so as to admit air to one or the other of conduit 76 or conduit 77. The one of said lower ports which said conduit 78' is not in communication with serves as an exhaust port for the one of said conduits 76 and 77 which is not being employed to pass air to cylinder 72. When solenoid 79' is not energized, valve 79 is normally biased to place conduit 76 in exhaust position.

Simultaneous with the completion of the circuit through timer 106 as described above, another circuit is completed through solenoid 83' by means of lead wires 114 and 115. Thus, the closing of switch 98 will actuate said solenoid 83' and switch four-way valve 83 to admit air from air header 78 through said valve 83 to conduit 84 which is connected to cylinder 82. This will actuate the piston in said cylinder 82 causing it to effect the withdrawal of brake member 81 (see FIGURES 4 and 5) from contact with recesses 67 in indexing ring 66. Although the actuation of solenoid 83' is of short duration, it is of sufficient time to withdraw brake member 81 from ring 66 because it is only necessary that said brake member be withdrawn long enough to initiate rotation of indexing ring 66. When once withdrawn, and ring 66 is moved, said brake member will ride on the surface between said recesses 67 until it again indexes with one of said recesses to again be effective as a brake. When solenoid 83' is not energized, the valve 83 connected thereto is normally biased to switch conduit 84 to an exhaust position through the port of said valve which is not in communication with air header 78. At the same time, conduit 85 is placed in communication with air header 78 and the piston in cylinder 82 is actuated in a direction to move brake member 81 toward indexing ring 66. Valve 83 is a conventional four-way valve.

During rotation of the frame of the bag closing machine in normal operation, as each bag receiving pocket containing a filled bag arrives at station 2 the lower horizontal bar of actuating lever 96 will strike the actuating bar of switch 99. If it is desired to apply the pressure sensitive tape to the top of the closed bag automatically, said switch 99 can be employed to effect actuation of an automatic tape applying machine, not shown. Thus said switch 99, together with its associated timer and associated circuits, can be employed to complete a circuit through solenoid 80' which will switch four-way valve 80 to admit air from air header 78 to actuate the taping machine. Said circuit which is completed through switch 99 and its associated timer and associated circuits is completed in exactly the same manner as described above in connection with switch 98 and timer 106. Any other suitable mechanism and/or circuitry can be employed to actuate the automatic taping machine. If an automatic taping machine is not employed, the tape is applied manually as described elsewhere herein.

At the next stage of rotation, the filled and taped bag arrives at station 3 where the lower horizontal bar of actuating lever 96 strikes the actuating bar of switch 101, a circuit is completed through the associated timer and its associated circuits, solenoid 94', and four-way valve 94 is switched to admit air to conduit 93 connected to cylinder 86. This will actuate the piston in said cylinder 86 and cause drive plate 91 to contact one of said bag push-off plates 152, 153, 154, and 156 and move the bag from the bag pocket at station 3. The operation of solenoid 94' and switch 94, responsive to closing of switch 101, is exactly the same as that described above for solenoid 79' and valve 79.

In view of the above description it is believed clear that the timers, such as timer 106, can be selected to give any desired timing cycle within reasonably broad limits. For example, in one bag closing machine which was fabricated in accordance with this invention, the machine was designed to handle fifteen bags per minute. Thus, a filled, unclosed bag enters the bag receiving pocket at station 1 every four seconds. The timers 106 are set accordingly. Approximately one second is required to complete each stage of rotation. Thus each bag receiving pocket is stationary at each of the stations 1, 2, 3, and 4 for approximately three seconds. Immediately upon arrival of a filled pocket at station 3 the bag removing means is actuated and the pocket is emptied. Approximately one second is required to complete this operation, i.e., for the piston in cylinder 86 to cause plate 91 to move the push-off plate at station 3 to extended position and simultaneously retract the push-off plate at station 1, and then retract plate 91. Thus, there is a leeway of approximately two seconds between completion of the bag removal from the pocket at station 3 and initiation of the next stage of rotation by entry of a bag into the pocket at station 1.

The wiring diagram in FIGURE 11 has been shown schematically in order to simplify the drawings. In actual construction the switches, timers, solenoids, valves, and associated lead wires are mounted on base 10 in suitable positions.

In the operation and practice of the invention a filled bag is delivered from a bag filling machine (not shown) by means of conveyor 116 into pocket 19-19' located at station 1 of the bag closing machine as illustrated in FIGURE 1. The lips of said bag are guided by means of rotating V-belts 117 and 118 which operate from a power source not shown and rotate over pulleys 119 and 121, respectively. Said pulleys can be suspended in the position illustrated by any suitable means. Prior to the entry of the filled bag into the bag receiving pocket 19-19' at station 1, fingers 48 and 49 are in the open receiving position as shown in FIGURE 2. Said V-belts 117 and 118 guide the lips of the filled bag between said fingers 48 and 49. The bag upon entering the bag receiving pocket strikes the upper horizontal bar of actuating lever 96 which causes the lower horizontal bar of said lever 96 to strike the actuating bar of switch 98 which completes the circuit as illustrated and described above in connection with FIGURE 11 causing air to be delivered to cylinder 72 through conduit 76. Piston 73 is thereupon actuated, the entire frame assembly is rotated 90° by means of the rotating means illustrated in FIGURE 5, and pocket 19-19' is moved from station 1 to station 2. The operation of the invention will be further described in terms of the movement of said pocket 19-19'.

FIGURE 1 illustrates the position of the apparatus after a bag has been ejected from pocket 22-22' at station 3 and just after the next stage of rotation has been initiated by entry of another bag into pocket 19-19' at station 1. Prior to the entry of the filled bag into the bag receiving pocket 19-19', fingers 48 and 49 are held in open position (see FIGURE 2) by cam lug 53 being in contact with extension 61 of slide plate 56. At this time main shaft 50 is prevented from rotating due to flat cam surface 42 on collar 41 bearing against the under side of small extension 57 on slide plate 56. As rotation of the frame is initiated said flat cam surface 42 clears said extension 57 on slide plate 56 and cam lug 53 clears said extension 61 on slide plate 59 whereupon spring 54 causes spur gears 51 and 52 to rotate finger shafts 46 and 47 and cause polished fingers 48 and 49 to close and engage the lips of the bag as shown in FIGURE 1. At the same time sprocket wheel 44 engages rack gears 63 on drive plate 62 (which is fixed to column 11 and remains stationary) and main shaft 50 is revolved 1¼ revolutions with said polished fingers 48 and 49 in closed position to roll the lips of the bag around said fingers and downwardly onto the body of the filled bag. Due to the arrangement of the indexing ring 66 and the rotating mechanism illustrated in FIGURE 5, the frame will be rotated through a 90° increment or stage with the pocket 19-19', formerly at station 1, moving to and stopping at station 2. It should be noted that the rolling down of the top of the bag occurs as said pocket 19-19' is being moved from station 1 to station 2. It should also be noted that during the movement of said pocket 19-19' from station 1 to station 2 the bottom of the pocket is raised in elevation, due to the change in elevation of track 35, an amount sufficient to compensate for the amount which the lips of the bag are rolled downwardly onto the body of the filled bag.

While said pocket 19-19' containing the filled bag with the rolled down top is at station 2, one or more, usually two, pieces of pressure adhesive tape are applied vertically across the rolled down portion of the bag as shown in FIGURE 1. Said pressure adhesive tape can be applied manually or it can be applied by means of any suitable automatic tape applying machine. Said tape applying machine can be actuated by means of switch 99 provided at station 2 expressly for this purpose. It is within the scope of the invention to thus actuate any suitable type of automatic tape applying machine which is employed in combination with the bag closing machine of the invention.

At station 2 flat cam surface 43 on collar 41 is in position to engage extension 58 on slide plate 56. The entry of another filled bag into the empty bag pocket 23-23' now at station 1 again activates the rotating mechanism as previously described and the pocket 19-19' is moved from station 2 to station 3. Upon initiation of said second stage or increment of movement, cam surface 43 on collar 41 engages extension 58 on slide plate 56 and prevents rotation of main shaft 50 during movement of said pocket 19-19' from station 2 to station 3. The polished fingers 48 and 49 thus remain in the rolled down portion of the bag lips.

Upon arrival of the filled and taped bag at station 3, the lower horizontal bar of actuating lever 96 strikes the actuating bar of switch 101 whereupon a circuit is completed as illustrated in FIGURE 11 to actuate the solenoid operated valve 94 and admit air to cylinder 86 through conduit 93. The piston in said cylinder 86 then moves drive plate 91 against push-off plate 152 and pushes the filled bag from off the polished fingers 48 and 49, out of pocket 19-19', and onto conveyor 122 (see FIGURE 1). At this point, the filled bag can, if desired, be pushed over by means of any suitable pushing apparatus, such as ram 123, onto conveyor 124 and transported to storage or other further handling. Simultaneously with the outward movement of push-off plate 152 at pocket 19-19', the push-off plate 153 at pocket 22-22' (now at station 1) is, of course, moved inward so as to open said pocket 22-22'.

The entry of another filled bag into the empty pocket 22-22' now at station 1 will activate rotation of the frame as previously described and the now empty pocket 19-19' at station 3 will be rotated to station 4 with its push-off plate 152 in extended position. During movement of the empty pocket 19-19' from station 3 to station 4 cam surface 43 on collar 41 remains in contact with extension 58 on slide plate 56 to prevent rotation of main shaft 50 and fingers 48 and 49 remain in their closed position. At station 4 said flat cam surface 43 on collar 41 disengages extension 58 on slide plate 56.

Upon the entry of another filled bag into the empty and open pocket 21-21' now occupying station 1, the rotating mechanism will be again activated as previously described and the empty pocket 19-19' at station 4 will be moved to station 1. Upon initiation of said last-mentioned stage of rotation sprocket 44 engages rack gears 64 on drive plate 62 and rotates the main shaft 50 three-fourths of one revolution. When sprocket 44 clears the end of the segment of rack gears 64, rotation of the main shaft 50, of course, stops. At this time cam lug 53 attached to gear 51 comes in contact with extension 61 on slide plate 59, the biasing action of spring 54 is overcome, and finger shafts 46 and 47 are rotated through 90° to place the polished fingers 48 and 49 in open receiving position as shown in FIGURE 2 upon arrival at station 1. At the same time flat cam surface 42 on collar 41 engages the small extension 57 on slide plate 56 and prevents rotation of main shaft 50. The pocket 19-19' which was originally at station 1 has now completed the circuit and is again in position at station 1 to receive another filled bag after being opened by retraction of its push-off plate 152 and start another revolution of the machine as described.

Referring to FIGURES 1 and 2 it will be clear that each of the other bag receiving pockets 21-21', 22-22', and 23-23' is provided with a bag engaging and closing means comprising a main shaft 50 and a pair of fingers 48 and 49. During the rotation of the frame each of said pockets goes through the four stages of movement, consecutively occupies each of the stations 1, 2, 3, and 4, and the same operations are carried out at each station as described above for pocket 19-19'. It is also clear that each of said pockets is provided with its own push-off plate.

When employing the wiring and switch arrangement illustrated in FIGURE 11, it is possible for a filled bag to enter the bag receiving pocket occupying station 1 and actuate switch 98 before drive plate 91 has completed its cycle of movement, i.e., from its normal retracted position to its extended position as when moving the one of push-off plates 152, 153, 154, or 156 associated with the pocket occupying station 3 so as to eject a bag from said pocket. When this happens and rotation is initiated while drive plate 91 and piston rod 89 attached thereto are in the extended position, there is a possibility of jamming the machine or at least damaging the machine due to said drive plate or piston rod striking brace member 32. Referring now to FIGURE 13, there is illustrated another suitable wiring and switch arrangement which can be employed to control the rotation and operation of the bag closing machine and which will eliminate these difficulties.

Using the wiring and switch arrangement in FIGURE 13, when a filled bag enters the bag receiving pocket occupying station 1, switch 98 will be momentarily actuated as described above in connection with FIGURE 11 and will complete a circuit from main lead wire 102, through switch 98" which operates simultaneously with switch 98, through lead wire 161, solenoid 83', and lead wire 162 to the other main lead wire 109. This circuit will energize said solenoid 83' which will switch four-way valve 83 to admit air from air header 73 to conduit 84 which is connected to cylinder 82 (see FIGURE 4) causing the piston in said cylinder to effect the withdrawal of brake member 81 (see FIGURES 4 and 5) from contact with recesses 67 in indexing ring 66, thus unlocking the rotating mechanism. At the same time, a circuit is completed through lead wire 163, interlock relay 164, lead wire 166, interlocking relay 167, lead wire 168, timer 169, and lead wire 171 to main lead wire 109 to energize said timer 169 and cause completion of a circuit through lead wire 172, solenoid 79', and lead wire 173 to said other main lead wire 109 and thus energize said solenoid 79'. Energizing of said solenoid 79' will switch four way valve 79 to admit air from air header 78 and conduit 78' to conduit 76 which is connected to cylinder 72 (see FIGURE 4) of the rotating mechanism and switch conduit 77 to exhaust. The admission of air through conduit 76 to cylinder 72 causes piston 73 to move in a direction to effect one stage of rotation, i.e., 90°, of the frame of the bag closing machine. Said solenoid 79' will be energized only for the period of time permitted by the predetermined timing cycle of said timer 169. When said timer 169 completes its timing cycle, said circuit through said solenoid 79' will be broken and four-way valve 79 will switch to a position to admit air to cylinder 72 via conduit 77. Upon said switching of valve 79, conduit 76 is, of course, placed in exhaust position. This reverses the action of piston 73 and places the rotation mechanism in position for the next stage of rotation.

Said relay 164 is a normally closed (insofar as lead wires 163 and 166 are concerned) interlocking relay which, as explained further hereinafter, will prevent energizing said solenoid 79' if said solenoid 83' is energized, i.e., if piston rod 89 and drive plate 91 are in the extended position.

When said circuit is completed through lead wires 168 and 171 and said timer 169 is energized, contacts are also completed in said timer 169 to complete a circuit which is energized from main lead wire 102, through lead wire 174, relay 167, lead wire 176, timer 169, lead wire 177, relay 167, and back to the other main lead wire 109 through lead wire 178. This last-mentioned circuit locks relay 167 in during the timing cycle of said timer 169.

During rotation of the frame of the bag closing machine in normal operation, as each bag receiving pocket containing a filled bag arrives at station 2, the lower horizontal bar of actuating lever 96 will strike the actuating bar of switch 99 and cause completion of a circuit from main lead wire 102 through lead wire 179, solenoid 80', and lead wire 181 to the other main lead wire 109. Completion of said circuit will cause said solenoid 80' to switch four-way valve 80 so as to admit air from air header 78 to actuate a taping machine and apply tape to the top of the closed and filled bag. As described above, said tape can be applied manually if desired.

At the next stage of rotation, the filled and taped bag arrives at station 3 where the lower horizontal bar of actuating lever 96 strikes the actuating bar of switch 101 completing a circuit from main lead wire 102 through lead wire 182, timer 183, lead wire 184, solenoid 94', and back to the other main lead wire 109 through lead wire 186. Completion of this last-mentioned circuit will energize said solenoid 94' and switch four-way valve 94 to admit air through conduit 93 to cylinder 86. This will cause the piston in said cylinder 86 to move drive plate 91 to its extended position and thus cause the one of kick-off plates 152, 153, 154, or 156 which is at station 3 to eject the bag from the bag pocket occupying said station 3. Said solenoid 94' is, of course, energized only during the predetermined timing cycle of said timer 183. Upon termination of said timing cycle, said solenoid 94' will be de-energized and valve 94 will switch to a position to admit air to conduit 92, place conduit 93 in exhaust position, and cause drive plate 91 and piston rod 89 to be moved to their retracted position.

Simultaneously with the energizing of said solenoid 94' another circuit is completed from timer 183 through lead wire 187 to relay 164 and from said relay 164 through lead wire 188 back to the other main lead wire 109. Completion of this last-mentioned circuit will open the contacts in relay 164 which normally serve to complete a circuit between lead wires 163 and 166 and thus lock out relay 167 making it impossible to energize solenoid 79' while solenoid 94' is energized. When the predetermined timing cycle of timer 183 is completed, said circuit which is completed through lead wire 187 is broken and said contacts in relay 164 return to their normally closed position making it possible to again complete a circuit through lead wires 163 and 166 and thus place the machine in condition for another stage of rotation.

Manual switch 98' can be employed to manually initiate rotation of the machine. However, it should be noted that said manual switch 98' is interlocked through timer 183, i.e., the circuit is completed from main lead wire 102 through lead wire 189, timer 183, lead wire 191, switch 98', and lead wire 192 to relay 167. When this last-mentioned circuit is completed, said relay 167 is energized in the same manner as when the circuit through switch 98, lead wire 163, relay 164, and lead wire 166 is completed. However, since said timer 183 and said circuit through said manual switch 98' are interlocked, said circuit through said switch 98' cannot be completed when timer 183 is in its timing cycle to complete the circuit through solenoid 94'. Thus, rotation of the machine cannot be manually initiated when said solenoid 94' is energized.

Said timer 106, said timer 169, said relay 167, and said relay 164 are all commercially available devices and, per se, form no part of the invention. Any suitable such device can be used in the practice of the invention. Said timer 106 is of the same type as described above in connection with FIGURE 11. Said timer 169 is a Haydon timer, 1.5 seconds, Type DA 21-001, and is a commercially available device manufactured by the A. W. Haydon Company, Waterbury 20, Connecticut. Said relay 167 is a Potter and Brumfield relay, KRP14, 3-pole, double throw relay manufactured by the Potter and Brumfield Company of Princeton, Indiana. Said relay 164 is a two-pole, single throw Allen-Bradley general purpose relay manufactured by the Allen-Bradley Company of Milwaukee, Wisconsin.

The invention is applicable to the closing of any type of flexible bag made of any flexible material such as paper, cloth, plastic, etc. The invention is particularly applicable to the closing of multi-wall open mouth paper bags. However, all types of bags, either single wall or multi-wall, can be closed according to the invention.

Figure 3:
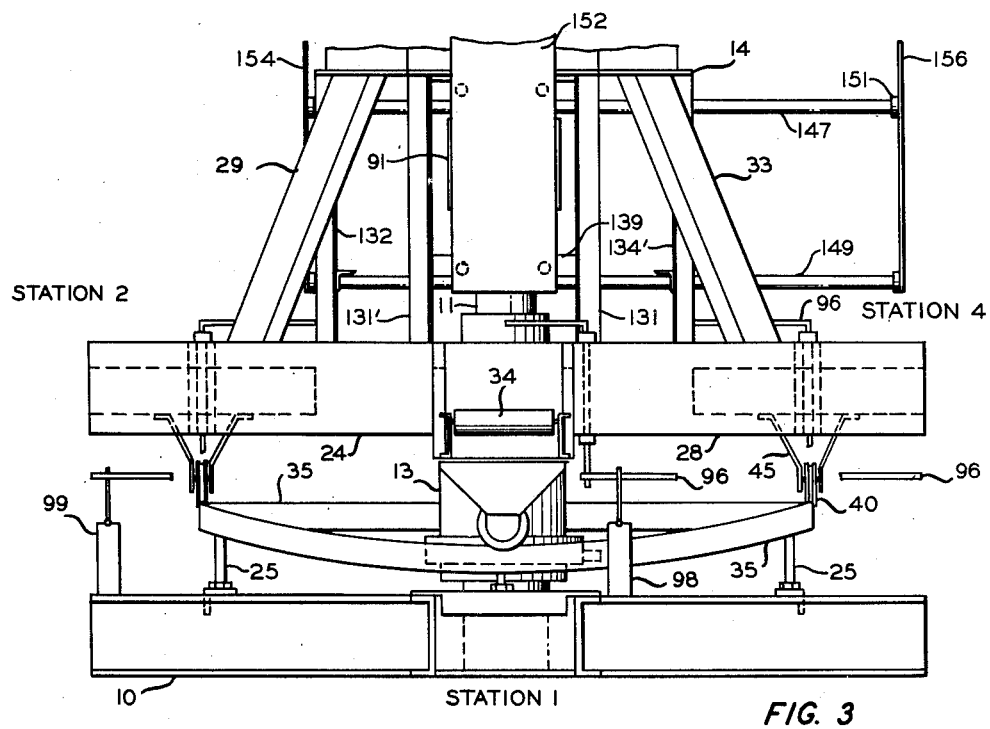

The actual dimensions of a bag closing machine fabricated in accordance with the invention will depend, to some extent, on the size of the filled and closed bag to be handled. For example, a machine fabricated in accordance with the invention for handling filled bags having a length of about 27 inches, a width of about 16 inches, and a thickness of about 4 inches when closed, had a width as measured through stations 2 and 4 (see FIGURE 2) of approximately 5 feet 6 inches and an overall height of approximately 5 feet (see FIGURES 1 and 3). The fingers 48 and 49 were mounted approximately 2 feet 8 inches above the bottom of the bag receiving pocket positioned at station 1 and were about 2 feet above the bottom of the bag receiving pocket at stations 2, 3 and 4. This difference in the elevation of said fingers above the bottom of the bag receiving pocket is, of course, due to the difference between the elevation of track 35 at station 1 and stations 2, 3, and 4. Reference to FIGURE 3 clearly shows this difference in elevation of said track 35 which causes the bottom of the bag receiving pocket to be elevated. The bag receiving pockets were each about 1 foot 4 inches in length and about 8 inches in width. Drive plate 62 was approximately 1 foot 9 inches in diameter. The remainder of the elements of the machine were proportionately sized.

The feature of the invention whereby the elevation of track 35 at station 1 is less than the elevation of said track at the other three stations 2, 3, and 4 affords one of the outstanding advantages of the invention. Not only does said difference in elevation make it possible to compensate for the amount of the bag top which is rolled down as the bag is moved from station 1 to station 2, but said difference in elevation also makes it possible to adjust the bag closing machine to handle different sizes of bags. This is made possible due to the fact that said track 35 is adjustably mounted on base 10, as shown in FIGURE 3 for example.

Other advantages of the machine are that it can be operated at any desired speed within reasonable limits so as to accommodate the bag filling equipment and different rates of production. This adjustment in rate of operation of the machine can be effected by varying the time cycle of the timers shown in FIGURES 11 and 13. The bag closing operation can be made entirely automatic, if desired, by employing an automatic taping machine in combination with the bag closing machine; or, the tape can be applied manually if desired. Still another advantage is that the troublesome sewing equipment formerly widely used for closing open mouth bags is eliminated. The tape employed according to the method of the invention is less expensive than the thread and tape employed in sewing.

The bag closing method of the invention provides a simple, neat, but yet very effective closure. The closed bag is substantially square on both ends. The closed bag is thus box-like and is much more adapted for stacking in storage and other handling. Rolling down the top of the bag reduces the volume of the finished container to substantially the volume of its contents. This firmer, more compact pack presents a more desirable appearance for sales appeal and can be handled and stored more efficiently.

While certain embodiments of the invention have been described for illustrative purposes, the invention obviously is not limited thereto. Various other modifications will be apparent to those skilled in the art in view of this disclosure. Such modifications are within the spirit and scope of the invention.

We claim:

1. A bag closing machine comprising, in combination: a rotatable frame; means for rotating said frame in stages through a plurality of consecutive stations comprising a first, a second, and a third station; a plurality of bag receiving pockets formed in said frame, each of said pockets being formed in a different side of said frame and spaced apart equidistantly from each other, and each of said pockets consecutively occupying said stations during said rotation of said frame; bag engaging means extending above each of said pockets and adapted to receive the lips of the open mouth of a bag when it is moved into the one of said pockets occupying said first station; a plurality of bag push-off plates movably mounted on said frame, each one of said push-off plates being mounted above and adjacent one each of said bag receiving pockets; means, including a first electrical circuit means, for actuating said rotating means when said open bag is moved into the said pocket at said first station; means for actuating and causing said engaging means to engage said lips of said bag and roll said lips around said engaging means as said pocket containing said bag is rotated from said first station to said second station, and thereby closing said bag; means, including a second electrical circuit means, for actuating one of said push-off plates when said pocket containing said closed bag reaches said third station so as to move said closed bag from said pocket; and a third electrical circuit means, interconnecting said first and said second electrical circuit means, for preventing energizing of said first electrical circuit means while said second electrical circuit means is energized.

2. A bag closing machine comprising, in combination: a rotatable frame; means for rotating said frame in 90 degree increments through consecutive first, second, third and fourth stations; four bag receiving pockets formed in said frame on different sides thereof, each of said pockets consecutively occupying said stations during said rotation of said frame; a bag push-off plate movably mounted on said frame above and adjacent each one of said bag receiving pockets; means, including a first electrical circuit means, for actuating said rotating means when an open bag is moved into the pocket occupying said first station; means for closing said open bag as said frame is rotated and said pocket containing said bag is moved from said first station to said second station; means, including a second electrical circuit means, for actuating said push-off plate when said pocket containing said closed bag reaches said third station so as to move said closed bag from said pocket containing same; and a third electrical circuit means, interconnecting said first and said second electrical circuit means, for preventing energizing of said first electrical circuit means while said second electrical circuit means is energized.

3. A bag closing machine comprising, in combination: a rotatable frame; means for rotating said frame in 90 degree increments consecutively through a first, a second, a third, and a fourth station; four bag reeciving pockets formed in said frame on four different sides thereof and spaced apart equidistantly from each other, each of said pockets consecutively occupying said stations during said rotation of said frame; four bag engaging means, each extending above one of said pockets and adapted to receive the lips of the open mouth of a bag when it is moved into the one of said pockets occupying said first station; four bag push-off plates, each movably mounted on said frame above and adjacent one of said bag receiving pockets and below one of said bag engaging means; means, including a first electrical circuit means, for actuating said rotating means when said open bag is moved into the said pocket occupying said first station; means for actuating said bag engaging means to engage said lips of said bag and roll said lips around said engaging means as said pocket containing said bag is rotated from said first station to said second station and thereby close said bag; means for raising the bottom of said pocket containing said bag as said bag is moved from said first station to said second station so as to compensate for the amount said lips of said bag are rolled down; means, including a second electrical circuit means, for actuating the one of said push-off plates mounted above and adjacent the said pocket containing said closed bag when said pocket containing said closed bag arrives at said third station so as to move said closed bag from said pocket containing same; and a third electrical circuit means, interconnecting said first and said second electrical circuit means, for preventing energizing of said first electrical circuit means while said second electrical circuit means is energized.

4. A bag closing machine comprising, in combination: a rotatable frame mounted on a base; means for rotating said frame in 90 degree increments consecutively through a first, a second, a third, and a fourth station; four bag receiving pockets formed in said frame on four different sides thereof and spaced apart equidistantly from each other, each of said pockets consecutively occupying said stations during said rotation of said frame; a bag conveyor assembly slidably mounted for limited vertical movement in each of said bag receiving pockets, a circular track mounted below said frame on said base, said track having a lower elevation at said first station than at said second, third, and fourth stations; separate means attached to each of said bag conveyor assemblies for movably supporting each said assembly individually on said track during said rotation of said frame; four bag engaging means each extending above one of said pockets and adapted to receive the lips of the open mouth of a bag when it is moved into the one of said pockets occupying said first station; four bag push-off plates, each movably mounted on said frame above and adjacent one of said bag receiving pockets and below one of said bag engaging means; means, including a first electrical circuit means, for actuating said rotating means when said open bag is moved into the said pocket occupying said first station; means for actuating said bag engaging means to engage said lips of said bag and roll same down as said pocket containing said bag is rotated from said first station to said second station, thereby closing said bag; means, including a second electrical circuit means, for actuating the one of said push-off plates mounted above and adjacent the said pocket containing said closed bag when said pocket arrives at said third station so as to move said closed bag from said pocket containing same; and a third electrical circuit means, interconnecting said first and said second electrical circuit means, for preventing energizing of said first electrical circuit means while said second electrical circuit means is energized.

5. A bag closing machine comprising, in combination: a base; a vertical support column centrally disposed with respect to and attached to said base; a first hub rotatably mounted around the lower portion of said column; a second hub rotatably mounted around the upper portion of said column; a frame surrounding said column, said frame being attached at its lower portion to said first hub and attached at its upper portion to said second hub; means for rotating said hubs and said frame around said column in 90 degree increments consecutively through a first, a second, a third, and a fourth station; four bag receiving pockets formed in said frame on four different sides thereof and spaced apart equidistantly from each other, each of said pockets occupying said first, second, third, and fourth stations consecutively as said frame is rotated; a bag conveyor assembly slidably mounted for limited vertical movement in each of said bag receiving pockets; a circular track mounted on said base and surrounding said support column, said track having a lower elevation at said first station than at said second, third, and fourth stations; separate means attached to each of said bag conveyor assemblies for movably supporting each said assembly individually on said track during said rotation of said frame; four bag engaging means, each operatively connected to said column above said second hub and extending above one of said pockets, and adapted to receive the lips of the open mouth of a bag when it is moved into the one of said pockets occupying said first station; four bag push-off plates, each movably mounted on said frame above and adjacent one of said bag receiving pockets and below one of said bag engaging means; means, including a first electrical circuit means, for actuating said rotating means when said open bag is moved into the said pocket at said first station; means for actuating said bag engaging means to engage said lips of said bag and roll same down as said pocket containing said bag is rotated from said first station to said second station, thereby closing said bag; means at said second station for actuating a tape applying machine for applying tape across the rolled down top of said closed bag; means, including a second electrical circuit means, for actuating the one of said push-off plates mounted above and adjacent the said pocket containing said closed bag when said pocket arrives at said third station so as to move said closed bag from said pocket containing same; and a third electrical circuit means, interconnecting said first and said second electrical circuit means, for preventing energizing of said first electrical circuit means while said second electrical circuit means is energized.

6. A bag closing machine comprising, in combination: a base; a vertical support column centrally disposed with respect to and attached to said base; a first hub rotatably mounted around the lower portion of said column; a second hub rotatably mounted around the upper portion of said column; a frame surrounding said column, said frame being attached at its lower portion to said first hub and attached at its upper portion to said second hub; means for rotating said hubs and said frame around said column in 90 degree increments consecutively through a first, a second, a third, and a fourth station; a first, a second, a third, and a fourth bag receiving pocket formed in said frame on four different sides thereof and spaced apart equidistantly from each other, each of said pockets occupying said first, second, third, and fourth stations consecutively as said frame is rotated; a bag conveyor assembly slidably mounted for limited vertical movement in each of said bag receiving pockets; a circular track mounted on said base and surrounding said support column, said track having a lower elevation at said first station than at said second, third, and fourth stations; separate means attached to each of said bag conveyor assemblies for movably supporting each said assembly individually on said track during said rotation of said frame; a first, a second, a third, and a fourth bag engaging means, each operatively connected to said column above said second hub and extending respectively above said first, second, third, and fourth pockets, and adapted to receive the lips of the open mouth of a bag when it is moved into the one of said pockets occupying said first station; a first, a second, a third, and a fourth bag push-off plate, each slidably mounted on said frame respectively above and adjacent said first, second, third, and fourth pockets and below said first, second, third, and fourth bag engaging means; means, including a first electrical circuit means, for actuating said rotating means when said open bag is moved into said pocket at said first station; means for actuating said bag engaging means extending above said pocket at said first station to engage said lips of said open bag and roll same down as said pocket containing said bag is rotated from said first station to said second station, thereby closing said bag; means, including a second electrical circuit means, for actuating said push-off plate mounted above and adjacent said pocket containing said closed bag when said pocket reaches said third station so as to move said closed bag from said pocket containing same; and a third electrical circuit means, interconnecting said first and said second electrical circuit means, for preventing energizing of said first electrical circuit means while said second electrical circuit means is energized.

7. A bag closing machine comprising, in combination: a rotatable frame comprising a lower first ring-like member and an upper second ring-like member; a first, a second, a third, and a fourth pair of spaced apart wall members extending horizontally from different sides of said first ring-like member to form a first, a second, a third, and a fourth bag receiving pocket with said pockets being spaced equidistantly from each other with respect to the mid-points thereof; means for rotating said frame around said column in 90 degree increments consecutively through a first, a second, a third, and a fourth station, each of said pockets occupying said first, second, third, and fourth stations consecutively during said rotation; means, including a first electrical circuit means, for actuating said rotating means when an open bag is moved into the said pocket occupying said first station; means for closing said open bag during movement of said pocket containing said bag from said first station to said second station; a first, a second, a third, and a fourth pair of vertical support members attached to and extending between said upper ring-like member and said lower ring-like member adjacent said first, second, third, and fourth pockets respectively; a first, a second, a third, and a fourth upper horizontally extending bearing support attached to said first, second, third, and fourth pair of said vertical support members respectively adjacent the upper ends thereof; a first, a second, a third, and a fourth lower horizontally extending bearing support attached to said first, second, third, and fourth pair of said vertical support members respectively adjacent the lower ends thereof; a first upper pair and a first lower pair of horizontal rods slidably extending through bearings mounted in said first and third upper and lower bearing supports respectively; a second upper pair and a second lower pair of horizontal rods slidably extending through bearings mounted in said second and fourth upper and lower bearing supports respectively; a first and a third vertically positioned bag push-off plate attached to the opposite ends of said first upper pair and said first lower pair of horizontal rods, and respectively disposed above and adjacent said first bag receiving pocket and said third bag pocket; a second and a fourth vertically positioned bag push-off plate attached to the opposite ends of said second upper pair and said second lower pair of horizontal rods, and respectively disposed above and adjacent said second bag receiving pocket and said fourth bag receiving pocket; means, including a second electrical circuit means, for moving the one of said push-off plates disposed above and adjacent said pocket containing said closed bag from the inboard edge to the outboard edge of said pocket when said pocket arrives at said third station, thereby emptying said pocket, and simultaneously moving the one of said push-off plates disposed above and adjacent the bag receiving pocket occupying said first station from the outboard edge to the inboard edge thereof and thereby opening said last-mentioned pocket; and a third electrical circuit means, interconnecting said first and said second electrical circuit means, for preventing energizing of said first electrical circuit means while said second electrical circuit means is energized.

8. A bag closing machine comprising, in combination: a base; a vertical support column centrally disposed with respect to and attached to said base; a first hub rotatably mounted around the lower portion of said column; a second hub rotatably mounted around the upper portion of said column; a first ring-like member surrounding said column at the level of and attached to said first hub; a second ring-like member surrounding said column at the level of and attached to said second hub; a first, a second, a third, and a fourth pair of spaced apart wall members extending horizontally from different sides of said first ring-like member to form a first, a second, a third, and a fourth bag receiving pocket with said pockets being spaced equidistantly from each other with respect to the midpoints thereof; means for rotating said hubs and said ring-like members around said column in 90 degree increments consecutively through a first, a second, a third, and a fourth station, each of said pockets occupying said first, second, third, and fourth stations consecutively during said rotation; means, including a first electrical circuit means, for actuating said rotating means when an open bag is moved into the said pocket occupying said first station; means for closing said open bag during movement of said pocket containing said bag from said first station to said second station; a first, a second, a third, and a fourth pair of vertical support members attached to and extending between said upper ring-like member and said lower ring-like member adjacent said first, second, third, and fourth pockets respectively; a first, a second, a third, and a fourth upper horizontally extending bearing support attached respectively to said first, second, third, and fourth pair of vertical support members adjacent the upper ends thereof; a first, a second, a third, and a fourth lower horizontally extending bearing support attached respectively to said first, second, third, and fourth pair of vertical support members adjacent the lower ends thereof; a pair of spaced apart holes provided in each of said upper and said lower bearing supports; a bearing mounted in each of said holes in said bearing supports; a first upper pair and a first lower pair of horizontal rods slidably extending through said bearings mounted respectively in said first and third upper and lower bearing supports; a second upper pair and a second lower pair of horizontal rods slidably extending through said bearings mounted respectively in said second and fourth upper and lower bearing supports; a first and a third vertically positioned bag push-off plate attached to the opposite ends of said first upper pair and said first lower pair of horizontal rods, and respectively disposed above and adjacent said first bag receiving pocket and said third bag receiving pocket; a second and a fourth vertically positioned bag push-off plate attached to the opposite ends of said second upper pair and said second lower pair of horizontal rods, and respectively disposed above and adjacent said second bag receiving pocket and said fourth bag receiving pocket; means, including a second electrical circuit means, for moving the one of said push-off plates disposed above and adjacent said pocket containing said closed bag from the inboard edge to the outboard edge of said pocket when said pocket arrives at said third station, thereby emptying said pocket, and simultaneously moving the one of said push-off plates disposed above and adjacent the bag receiving pocket occupying said first station from the outboard edge to the inboard edge thereof and thereby opening said last-mentioned pocket; and a third electrical circuit means, interconnecting said first and said second electrical circuit means, for preventing energizing of said first electrical circuit means while said second electrical circuit means is energized.

References Cited in the file of this patent

UNITED STATES PATENTS

| | | |
|---|---|---|
| 852,961 | Keyes | May 7, 1907 |
| 1,452,604 | Hopkins | Apr. 24, 1923 |
| 1,545,513 | Peters et al. | July 14, 1925 |
| 2,712,210 | Sawyer et al. | July 5, 1955 |
| 2,892,293 | Langdon | June 30, 1959 |